(12) United States Patent
Bienstman et al.

(10) Patent No.: US 9,139,786 B2
(45) Date of Patent: Sep. 22, 2015

(54) METHODS AND SYSTEMS FOR SENSING (75) Inventors: Peter Bienstman, Ghent (BE); Tom Claes, Ghent (BE); Katrien De Vos, Borgerhout (BE); Jan-Willem Hoste, Damme (BE); Wim Bogaerts, Melle (BE)

(73) Assignees: UNIVERSITEIT GENT, Gent (BE); IMEC, Leuven (BE)

( * ) Notice: Subject to any disclaimer, the term of this patent is extended or adjusted under 35 U.S.C. 154(b) by 645 days.

(21) Appl. No.: 13/452,180

(22) Filed: Apr. 20, 2012

(65) Prior Publication Data

US 2012/0296604 A1 Nov. 22, 2012

Related U.S. Application Data

(60) Provisional application No. 61/478,103, filed on Apr. 22, 2011.

(51) Int. Cl.
*G01B 5/02* (2006.01)
*C10J 3/46* (2006.01)
*C10L 3/08* (2006.01)
*C10L 3/10* (2006.01)

(52) U.S. Cl.
CPC .. *C10J 3/463* (2013.01); *C10L 3/08* (2013.01); *C10L 3/101* (2013.01); *C10J 2300/093* (2013.01); *C10J 2300/0973* (2013.01); *C10J 2300/0986* (2013.01); *C10J 2300/1807* (2013.01); *C10J 2300/1838* (2013.01)

(58) Field of Classification Search
CPC ............ C10J 3/463; C10L 3/101; C10L 3/08
USPC ........................................................ 702/171
See application file for complete search history.

(56) References Cited

U.S. PATENT DOCUMENTS 7,396,684 B2 * 7/2008 Ehrfeld et al. ................ 436/164
7,473,916 B2 * 1/2009 Singh ......................... 250/504 R
8,105,819 B2 * 1/2012 Moore ....................... 435/287.1

* cited by examiner

*Primary Examiner* — Tung S Lau
*Assistant Examiner* — Xiuquin Sun
(74) *Attorney, Agent, or Firm* — Bacon & Thomas, PLLC (57) ABSTRACT

A sensing device for sensing a substance includes a photonics integrated circuit having a resonator element that supports two different radiation modes, e.g. radiation modes of different polarisation, at a predetermined resonance wavelength. The resonator element is configured to convert a phase change or amplitude change experienced by the two different radiation modes upon formation of a layer of receptor molecules onto a sensing surface of the device into a resonance wavelength shift for the two different radiation modes. The sensing device also includes a detection unit arranged to detect the resonance wavelength shift for the two different radiation modes. The detection unit includes a processor that is configured to derive from the detected resonance wavelength shifts for the two different radiation modes, a layer thickness and refractive index of the layer of receptor molecules.

19 Claims, 6 Drawing Sheets

METHODS AND SYSTEMS FOR SENSING

CROSS-REFERENCE TO RELATED APPLICATIONS

The benefit of U.S. provisional application No. 61/478,103 filed Apr. 22, 2011 is claimed and the provisional application is incorporated herein by reference.

TECHNICAL FIELD OF THE INVENTION

The present invention relates to methods and systems for biological, biochemical or chemical sensing and/or detecting of particles. More particularly, the present invention relates to methods and systems for biological, biochemical and/or chemical sensing and/or detecting of particles using a dual beam resonator sensor.

BACKGROUND OF THE INVENTION

The use of photonic integrated circuits, e.g. ring resonator sensors in high index contrast media, for biological and chemical sensing is well established. The high sensitivity of this technique to surface phenomena makes it ideal for use in real-time and label-free biosensors where very small changes in refractive index must be detected. Driven by the vision of a laboratory on a chip and its impact in numerous applications such as detection, bio sensing, kinetic and binding studies and point-of-care diagnostics, extensive work has been done to develop these miniature photonic integrated biosensors. In the past decade, several integrated optical sensors have been demonstrated, mainly using ring resonator sensors, where the detection of biomolecular interaction happens by tracking the wavelength shift of one resonant ring resonator mode.

Figure 2:
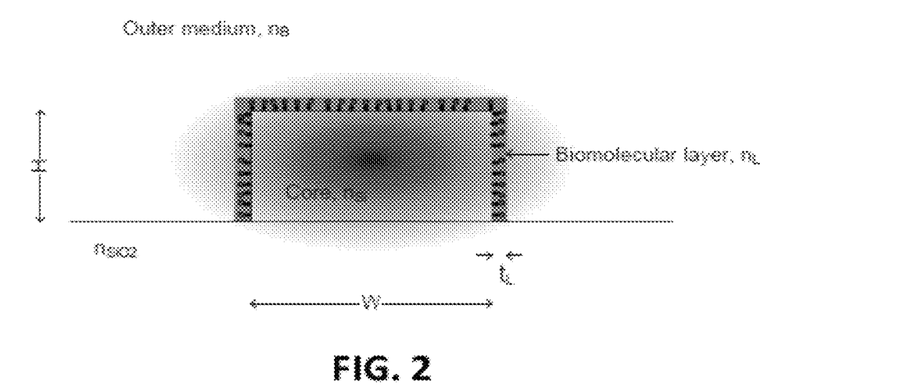
FIG. 2 illustrates an optical model of a layer in which biomolecular interaction takes place, illustrating features and advantages of embodiments of the present invention.

Biomolecular interaction between a receptor molecule, previously deposited on a waveguide surface, and its complementary analyte, produces a change in refractive index at the sensor surface that induces a variation in the optical properties of the guided light via the evanescent field. A biomolecular layer can be optically modeled as a uniform layer with a certain thickness tL and a certain refractive index nL as is shown in FIG. 2. Most biosensing techniques cannot distinguish between thickness $t_L$ and refractive index $n_L$ of the binding layer on top of the biosensor, and the output is linked to a combination of these parameters or to another calibration parameter such as the molecular concentration.

In today's biological experiments performed on integrated biosensors, usually only one parameter is measured, being the resonance wavelength shift of the $TE_{00}$ or $TM_{00}$ resonating mode when biomolecular interaction occurs.

Figure 1:
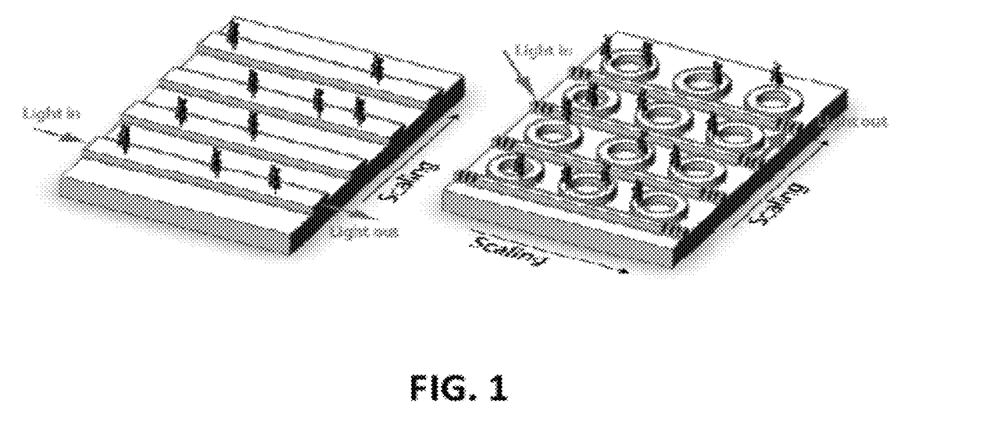
FIG. 1 illustrates a traditional long straight dual beam interferometric configuration which scales only linearly (left hand side) as known from prior art, FIG. 1 (right hand side) also illustrates a dual beam ring resonator configuration according to an embodiment of the present invention.

In one system making use of both TE and TM mode responses, an interferometer-based sensor constructed from two optical waveguides stacked on top of each other and an array photodiode is shown in FIG. 1, left drawing. When polarized light (TM) is introduced to the end of the stack, single mode excitations in sensing and reference waveguides are formed and propagate through the structure. At the output, they form the well-known pattern of Youngs interference fringes on an array photodiode. On exposing the sensing waveguide to a biomolecule that attaches to it, the phase will change in the sensing waveguide while the effective index of the reference waveguide does not change. Monitoring the relative phase position of the fringe pattern will reveal the TM output. Subsequently, a second polarization of light (TE) is introduced into the waveguide stack. As explained, this responds differently to biomolecule adsorption or removal, and provides a second independent measurement. For each polarization there are an infinite number of refractive index/film thickness combinations that will produce the observed effect. However, when both polarizations are taken together a unique solution is resolved.

However, DPI as available today is not a high throughput technique and without miniaturization it does not lend itself to the levels of multiplexing necessary for drug discovery. This system handles only a very limited number of parallel measurements (currently 2), since the optical input and output signals are coupled via the edges of the waveguide chip and different channels need to be straight, long, and well separated as is shown in FIG. 1. Moreover, the polarizations are sequentially measured due to the buried interferometric design.

SUMMARY OF THE INVENTION

It is an object of the present invention to provide a good, e.g. improved with respect to some prior art, method and system for biological, biochemical or chemical sensing and/or detecting particles.

It is an advantage of embodiments of the method and system according to the present invention that it allows determining the thickness and refractive index of a layer to be sensed, e.g. a biomolecular layer, based on a single measurement.

It is an advantage of at least some embodiments of the method and system according to the present invention that it allows determining the thickness and refractive index of a layer to be sensed, e.g. a biomolecular layer, simultaneously.

It is an advantage of embodiments of the method and system according to the present invention that conformational information on the biomolecular layer can be obtained. Conformational information of the molecules is of major importance in genomics and proteomics. The folding and misfolding of proteins, for example, are increasingly topics of study in their connection with the onset of degenerative diseases such as Alzheimers disease. In genomics, finding information on DNA probe orientation, probe mobility and surface coverage and assessing the impact they have on hybridization efficiency are of critical importance in the development of immobilization methods. Embodiments of the device and method according to the present invention allow for example to differentiate between allosteric and promiscuous binders through a combination of biophysical measurement of conformation, mass of binding and their kinetics. Ranking may then be achieved simultaneously on the basis of both the mechanisms of action and strength of binding (affinity) rather than just the latter, as is currently the case. This creates a quantitative analytical methodology for drug candidate selection based on the mechanism of action by the determination of conformation-activity relationships (CAR).

It is an advantage of embodiments of the device and method of the present invention that it allows reducing false positives and accelerating lead optimisation ahead of current time-consuming (and static) biophysical characterisation methodologies such as isothermal titration calorimetry (ITC), x-ray crystallography, mass spectroscopy (MS), or nuclear magnetic resonance (NMR).

It is an advantage of the device and method according to the present invention that it allows extracting more information on biomolecular interactions with a single resonator, e.g a ring resonator. It is an advantage of the device and method according to embodiments of the present invention that interrogation of the wavelength shift of two resonating modes, preferably two orthogonally resonating modes may provide information on the thickness as well as on the refractive index of a layer at the sensor surface using a single measurement, e.g. simultaneously. It is an advantage of embodiments of the present invention that a device and method may be provided with good, for instance improved with respect to the prior art, detection limits. It is an advantage of embodiments of the present invention that a device and method may be provided with good, for instance improved with respect to the prior art, accuracy of the thickness and/or the refractive index of the biomolecular layers.

The above object will be obtained by methods and systems according to embodiments of the present invention as described below.

The present invention relates to a sensing device for sensing a substance, the sensing device comprising a photonics integrated circuit comprising a resonator element for supporting two different radiation modes, e.g. radiation modes of different polarisation, at a predetermined resonance wavelength, the resonator element being configured for converting a phase change or amplitude change experienced by said two different radiation modes upon formation of a layer of receptor molecules onto a sensing surface of the device into a resonance wavelength shift for said two different radiation modes, and a detection unit arranged for detecting the resonance wavelength shift for said two different radiation modes, wherein the detection unit comprises a processor arranged for deriving from the detected resonance wavelength shifts for said two different radiation modes, a layer thickness and refractive index of the layer of receptor molecules.

The resonator element for supporting two different radiation modes may be arranged for supporting two radiation modes of different polarisation being a TE mode and a TM mode.

The two different radiation modes may be a first radiation mode and a second radiation mode and the processor may be arranged for deriving a layer thickness and refractive index of the layer of receptor molecules is arranged for determining from the detected resonance wavelength shift for the first radiation mode a first set of possible values for layer thickness and refractive index, determining from the detected resonance wavelength shift for the second radiation mode a second set of possible values for layer thickness and refractive index, and deriving based on a comparison of said first set of possible values and said second set of possible values a set of derived values for the layer thickness and the refractive index of the layer of receptor molecules.

Determining a set of possible values from the detected resonance wavelength shift for any of the first or second radiation mode may comprise comparing the detected resonance wavelength shift with calibration data for the layer thickness and refractive index as function of the resonance wavelength shift.

The calibration data may be simulated data, reference data or data based on a physical model for the corresponding radiation mode.

Deriving derived values based on a comparison of said first set of possible values and said second set of possible values may comprise finding a set of values for the layer thickness and refractive index being common to both the first set and the second set of possible values.

The sensing device furthermore may comprise a thermometer for measuring a temperature at which the sensing is performed.

The sensing device furthermore may comprise a heater and/or cooler for setting the temperature at which the sensing is performed to a predetermined temperature.

The resonator element may be embedded in the device so that the top surface of the resonator element is planar with the remaining part of the device.

The resonator element may be protruding from the device.

The resonator element may be arranged for supporting simultaneously the two different radiation modes.

The present invention also relates to a processor arranged for deriving a layer thickness and refractive index of a layer of receptor molecules, said deriving being based on detected resonance wavelength shifts for two different radiation modes, e.g. radiation modes of different polarisation, supported by a resonator element, said wavelength shifts being induced upon formation of a layer of receptor molecules onto a sensing surface near the resonator element. The present invention furthermore relates to a method for sensing a substance, the method comprising coupling different radiation modes, e.g. radiation modes of different polarisation, into a resonator element and supporting the different radiation modes in the resonator element, allowing formation of a layer of receptor molecules on a sensing surface of the device, detecting a shift in the resonance wavelength for the different radiation modes, and deriving, from the detected resonance wavelength shifts for said different radiation modes, a layer thickness and refractive index of the layer of receptor molecules.

The method may comprise coupling and/or supporting the radiation modes simultaneously or subsequently to or in the resonator element.

The different radiation modes may comprise a first radiation mode and a second radiation mode and the method may comprise deriving a layer thickness and refractive index by determining from the detected resonance wavelength shift for the first radiation mode a first set of possible values for layer thickness and refractive index, determining from the detected resonance wavelength shift for the second radiation mode a second set of possible values for layer thickness and refractive index, and deriving based on a comparison of said first set of possible values and said second set of possible values a set of derived values for the layer thickness and the refractive index of the layer of receptor molecules.

Determining a set of possible values from the detected resonance wavelength shift for any of the first or second radiation mode may comprise comparing the detected resonance wavelength shift with calibration data for the layer thickness and refractive index as function of the resonance wavelength shift.

The calibration data may be any of simulated data, reference data or data based on a physical model.

The method may comprise measuring a temperature using a thermometer and taking into account said measured temperature.

The method may comprise setting the resonator element used for sensing to a predetermined temperature.

Access to both layer thickness $t_L$ and refractive index $n_L$ may yield information on the density as well as on the thickness of the layer to be sensed, e.g. the biomolecular layer, allowing embodiments of the method and system according to the present invention to derive conformational information of the layer to be sensed, e.g. the biomolecular layer.

This can be understood as follows. The density of the biomolecular layer can be derived from the formula:

$$\rho_L = \rho_{protein}(n_L - n_B)/(n_{protein} - n_B)$$

where $\rho_{protein}$ is the density of dry proteins [g/cm3], generally accepted to be $\rho_{protein}=1.33$ g/cm3, $n_B$ is the refractive index of the bulk cover medium and $n_{protein}$ is the refractive index of the dry molecules and is typically reported to be between 1.45 and 1.48. A molecule in folded configuration will for instance result in a higher density and lower thickness, compared to the same molecule being in linear configuration. The above can be generalized to a layer of any type of component, by replacing the density and refractive index of the dry proteins with the density and refractive index of the dry components.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present application reference is made to a photonics integrated circuit (PIC), this refers to a variety of forms and material systems such as for example low-index contrast waveguide platforms (e.g. polymer waveguides, glass/silica waveguides, $Al_xGa_{1-x}As$ waveguides, $In_xGa_{1-x}As_yP_{1-y}$ waveguides, SiNiwaveguides), high-index contrast waveguides (e.g. Silicon-on-Insulator, semiconductor membranes), plasmonic waveguides (e.g. metal nano-particle arrays, metal layers), also called Photonic Lightwave circuits (PLC). A photonic integrated circuit comprises at least one integrated optical component, such as for example but not limiting to an integrated optical cavity, an integrated optical resonator, an integrated optical interferometer, an integrated optical coupler, a waveguide, a taper, a tunable filter, a phase-shifter, a grating, a modulator, a detector, a source or a combination thereof. The optical resonator might be a ring resonator. The optical components can be active or passive. The devices and methods according to embodiments of the present invention are further described for the particular case of an SOI (Silicon-on-Insulator) material system, also referred to as silicon photonics system. However, the devices and methods according to embodiments of the present invention can be based on other material systems, such as for example III-V material systems, metallic layers, low index contrast material systems or a combination thereof.

Silicon-on-Insulator is a very interesting material system for highly integrated photonic circuits. The high refractive index contrast allows photonic waveguides and waveguide components with submicron dimensions to guide, bend and control light on a very small scale so that various functions can be integrated on a chip. Moreover SOI offers a flexible platform for integration with surface plasmon based components which in turn allows for even higher levels of miniaturization. Both waveguide types allow a high level of miniaturization, which is advantageous. Furthermore for both waveguide types light can be efficiently coupled in and out the PIC by use of e.g. a grating coupler or another coupling element.

Using Silicon-on-insulator also has some technological advantages. Due to the CMOS industry, silicon technology has reached a level of maturity that outperforms any other plane chip manufacturing technique by several orders of magnitude in terms of performance, reproducibility and throughput. Nano-photonic ICs can be fabricated with wafer scale-processes, which means that a wafer can contain a high amount of photonic integrated circuits. Combined with the commercial availability of large wafers at a relative moderate cost, this means that the price per photonic integrated circuit can be very low. This is a significant economic advantage when producing integrated photonic circuits to be used as part of the optical sensor probe according to embodiments of the present invention. It may for example make the use of disposable probes a viable option.

Where in the present application reference is made to "photonics integrated circuit compatible", reference is made to components that can be integrated in the semiconductor chip or platform.

Where in embodiments of the present application reference is made to integration, such integration may comprise monolithical, heterogeneous or hybrid integration. In some embodiments, such integration also may enclose fibre coupling of components to the silicon chip or platform.

Where in embodiments of the present application reference is made to radiation, reference is made to electromagnetic radiation. The radiation envisaged is radiation having a suitable wavelength or wavelength range for sensing, i.e. detecting or imaging, a substance. In some embodiments radiation used will be infrared radiation, e.g. near infrared radiation or mid infrared radiation. In some embodiments, the radiation has a wavelength or wavelength range between 1200 nm and 2500 nm, or between 2500 nm and 10000 nm, or a combination thereof, although the invention is not limited thereto.

Where in the present application reference is made to a dual beam photonic integrated circuit based sensor or biosensor, reference is made to a sensor or biosensor comprising a photonic integrated circuit that is able to support at least two different radiation beams, e.g. radiation beams having a substantially different polarization. In one embodiment, such two different radiation beams may be a TE polarized radiation beam and a TM polarized radiation beam, although embodiments of the present invention are not limited thereto. Where the different radiation beams are radiation beams having a substantially different polarisation, reference may be made to a dual polarization photonic integrated circuit based sensor.

Where in the present application reference is made to two different radiation beams, two radiation beams may be envisaged which undergo a different resonance wavelength shift in a resonator upon binding of a layer of molecules near or on the resonator.

Where in embodiments of the present invention reference is made to two radiation beams having substantially different polarisation, reference is not only made to two radiation beams whereby one has a TE polarisation and the other has a TM polarisation, but for example also to radiation beams whereby different modes of a polarisation type are used, such as for example a $TE_{00}$ or $TM_{00}$ mode on the one hand and a higher order TE or TM mode on the other hand or two higher order TE or TM modes or a combination thereof.

Figure 3:
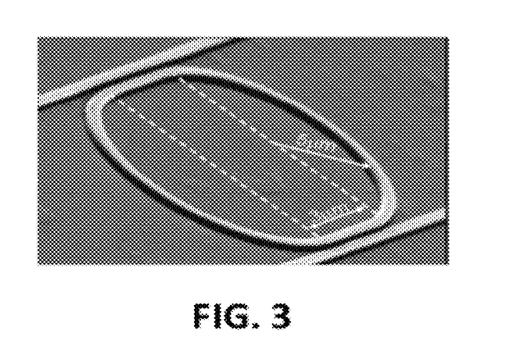
FIG. 3 illustrates a silicon photonics ring resonator, as can be used in an embodiment of the present invention.

By way of illustration, a part of the invention is described by use of an embodiment of a ring resonator defined in a silicon/silicondioxide waveguide as shown in FIG. 3. It is to be noticed that embodiments of the present invention are not limited thereto. It is clear to the person skilled in the art that the invention is not limited to ring resonator designs or a silicon/silicondioxide material system. In the case silicon is used, the propagating layer is silicon and the cladding layer is silicondioxide. The high refractive index contrast ensures tight confinement of the optical power to the waveguide, however this is not a necessary condition for the operation of this device. The high refractive index may e.g. be larger than 2 refractive index units (RIU), e.g. be larger than 2.5 refractive index units (RIU) or e.g. be larger than 3 refractive index units (RIU).

In a first aspect, the present invention relates to a sensing device and a method for sensing a substance. The sensing device comprises a photonics integrated circuit comprising a resonator element for supporting two different radiation modes, e.g. two radiation modes of different polarisation, at a predetermined resonance wavelength. The resonator element thereby is being configured for converting a phase change or amplitude change experienced by said two different radiation modes upon formation of a layer of receptor molecules onto a sensing surface of the device into a resonance wavelength shift for said two different radiation modes. The sensing device furthermore comprises a detection unit arranged for detecting the resonance wavelength shift for said two different radiation modes. The detection unit also comprises a processor arranged for deriving from the detected resonance wavelength shifts for said two different radiation modes, a layer thickness and refractive index of the layer of receptor molecules.

Figure 13:
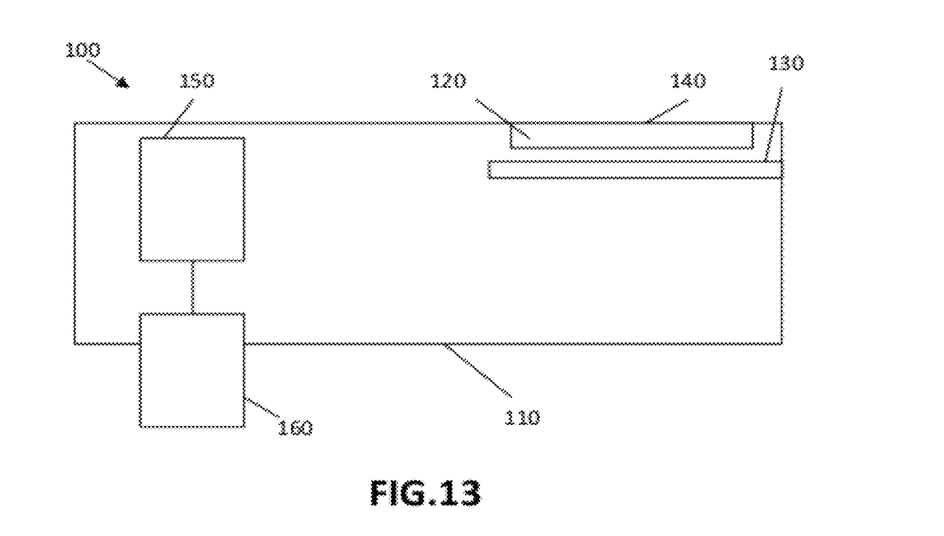
FIG. 13 illustrates a schematic overview of a sensing device according to an embodiment of the present invention.

By way of illustration, embodiments of the present invention not being limited thereto, the standard and optional features and advantages of sensing devices according to embodiments of the present invention will be discussed with more detail with reference to an exemplary sensing device as shown in FIG. 13.

The sensing device 100 as shown in FIG. 13 comprises a sensor being a photonics integrated circuit based sensor 110. The photonics integrated circuit based sensor may be a silicon photonics based sensor, although embodiments of the present invention are not limited thereto. In particular, embodiments of the present invention relate to a dual beam photonic integrated circuit based biosensor. The photonics integrated circuit based sensor 110 therefore comprises a resonator element 120 arranged for supporting two different radiation modes, e.g. radiation modes of substantially different polarisation, at a predetermined resonance wavelength. In embodiments of the present invention, the resonator element 120 is arranged for supporting two different radiation modes, e.g. two radiation modes having different polarisation, preferably two orthogonally polarised radiation modes, such as for instance the $TE_{00}$ and $TM_{00}$ modes. Alternatively to the $TE_{00}$ and the $TM_{00}$ modes, embodiments according to the present invention may comprise measuring two other polarization modes simultaneously or subsequently, such as for instance the $TE_{00}$ or $TM_{00}$ mode on the one hand and a higher order TE or TM mode on the other hand or two higher order TE or TM modes or a combination thereof. In an advantageous embodiment, the different modes can be excited simultaneously. When for example the modes $TE_{00}$ and $TM_{00}$ are simultaneously excited in a ring resonator, they will propagate orthogonally with a different effective index and a different group velocity. Hence they will resonate at different resonance wavelengths. The sensitivity of their effective indices $n_{\mathit{eff},TE}$ and $n_{\mathit{eff},TM}$ to environmental changes will differ depending on the field distribution. For all of these reasons, the resonance wavelength of $TE_{00}$ and $TM_{00}$ will shift a different amount when biomolecular interaction takes place at the resonator surface. Measurement of both wavelength shifts and accurate processing allows to disentangle $n_L$ and $t_L$ and hence obtain conformational information on the biomolecular layer as will be described hereinafter. As will be discussed further, the measurement principles of devices and methods according to the present invention is based thereon.

According to embodiments of the present invention, the resonator element 120 thus is configured for translating a phase change or amplitude change, experienced by said two different radiation modes upon formation of a layer of receptor molecules onto a sensing surface of the device, into a resonance wavelength shift for said different two radiation modes in the resonator element. The sensing principle used for sensing thereby thus is based on optical modes in the resonator element that experiences a different phase or amplitude change upon receipt of a receptor molecule onto the sensing surface of the device. The resonator element 120 in this way converts the phase or amplitude change induced by the environment in optical modes supported in the resonator element in a resonance wavelength shift for the modes in the resonator element. The resonator element therefore also may be referred to as a transducer element. If for example a TE and TM mode is used, the resonance wavelength shifts obtained can be expressed as shifts $\Delta\lambda_{TE}$ and $\Delta\lambda_{TM}$, given by $$\Delta\lambda_{TE} = \Delta_{env} n_{\mathit{eff},TE} \cdot \lambda_{res}/n_{g,TE}$$

$$\Delta\lambda_{TM} = \Delta_{env} n_{\mathit{eff},TM} \cdot \lambda_{res}/n_{g,TM}$$

The resonator element 120 may for instance be or comprise a ring resonator defined in the waveguide layer of the device as is shown in FIG. 3. Alternatively, the resonator element may comprise other filter types, such as for instance, without being limited thereto, Mach-Zehnder interferometers or embodiments with multiple ring resonators. In some embodiments, such a resonator element may be fully embedded in the device structure such that only the top surface of the resonator element is free for sensing. Such embodiments may also be referred to as planarized devices. Such planarized devices may for example be obtained by embedding the resonator element in the photonic integrated circuit, e.g. using a filling material such as for example silicon dioxide. In other embodiments, the resonator element may be protruding from the device structure such that the sensing surface also spreads out to the side walls of the resonator element.

As indicated above, the device according to an embodiment of the present invention allows coupling both different modes, e.g. radiation modes with substantially different polarisation, such as for instance a TE and TM polarized radiation mode, subsequently but alternatively also simultaneously to the resonator element 120, e.g. ring resonator. The sensing device 100 therefore is equipped with a coupling means 130 for coupling both modes either subsequently or simultaneously to the resonator element 120. The different ways of coupling will be described first by way of a number of examples.

In a first example, coupling of both different modes is performed simultaneously. Using simultaneously coupling of both different modes is in contrast with the Analight® commercial tool where TE and TM polarization are alternated and thus real-time measurements are performed with half the frequency. In order to achieve simultaneous supporting of the modes, in one example the device according to an embodiment of the present invention can comprise a dual mode coupler, which allows coupling both modes simultaneously, for instance the TE and TM mode, e.g. in at least one access waveguide of the device. The dual mode coupler may for instance comprise a 1D grating coupler, a 2D coupler or a focusing grating coupler or any other coupler considered suitable by the person skilled in the art. In the embodiment of the device shown in FIG. 8, a single 1D grating coupler is used to couple both the TE and TM mode to an access waveguide, while in the exemplary device in FIG. 9 two 1D grating couplers are used to each couple one of the modes to an access waveguide. In both embodiments, an identical coupling scheme is used to couple the modes again out of the access waveguide. The exemplary devices shown in FIG. 8 and FIG. 9 further comprise a ring resonator that can guide both modes simultaneously, for instance the TE and the TM mode. Alternatively, the device according to embodiments of the present invention may comprise another filter, such as for instance, without being limited thereto, Mach-Zehnder interferometers or embodiments with multiple ring resonators. In order to achieve a simultaneous guiding of both modes the width and height of the waveguide may be properly designed. In the examples shown in FIG. 8 and FIG. 9 use is for instance made of a 220 nm high and 450 nm wide silicon waveguide, which can guide both the $TE_{00}$ and $TM_{00}$ mode in water environment, but the method and device according to the present invention is not being limited thereto.

Figure 8:
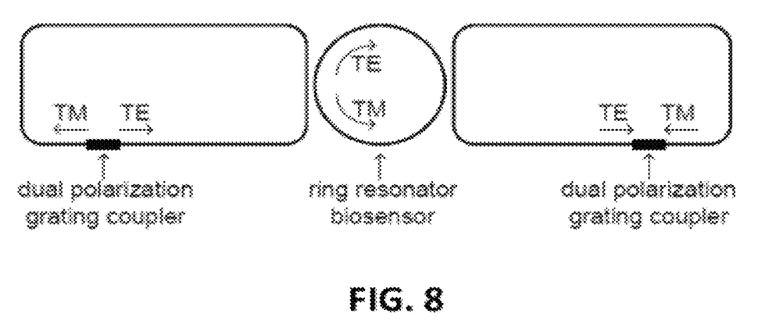
FIG. 8 illustrates an implementation of a dual beam ring resonator biosensor according to an embodiment of the present invention
Figure 9:
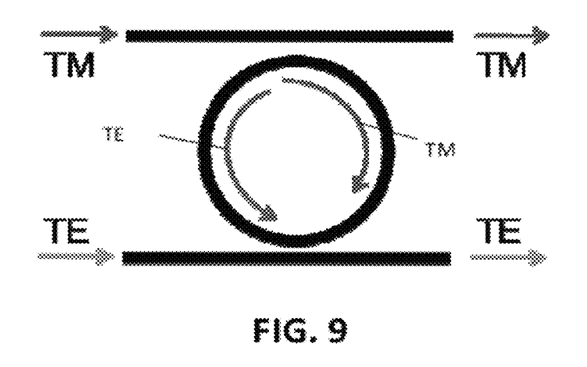
FIG. 9 illustrates a possible implementation of a biosensor wherein two access waveguides are provided for one ring, one access waveguide for TE and one access waveguide for TM, as can be used in an embodiment of the present invention.

In both exemplary devices illustrated above, the TE and TM mode are excited in opposite directions (clockwise and counter-clockwise) of the ring resonator. Systems and methods according to embodiments of the present invention are not limited to this case, and also works when both different modes would be excited in the same direction (so both clockwise or both counter-clockwise).

The exemplary devices shown in FIG. 8 and FIG. 9 further comprise two access waveguides. Each of the access waveguides may be properly designed to guide both modes, e.g. for guiding both modes simultaneously. Alternatively, one or both of the access waveguides may be properly designed to guide only one of both modes simultaneously. In general, the device according to the present invention preferably comprises at least one access waveguide which is properly designed to guide both modes, e.g. for guiding both modes simultaneously.

The exemplary devices shown in FIG. 8 and FIG. 9 further preferably comprise a coupling section, that couples both modes from the at least one access waveguide to the ring resonator.

The coupling section shown in FIG. 8 and FIG. 9 comprises a directional coupler, but embodiments of the present invention are not being limited thereto. Preferably, the directional coupler is designed so that both modes will have a large extinction, meaning that the coupling of both modes from the at least one access waveguide to the ring resonator is matched to the roundtrip losses of that mode. This will be explained in more detail later. The method can also be applied to a ring resonator with only one access waveguide.

In the embodiment of the exemplary device depicted in FIG. 8 a grating duplexer is used to spatially separate both polarizations in the same wavelength band. Due to reciprocity, the device according to the present invention may comprise similar technical features that allow coupling out both modes from the ring resonator.

By optimizing the grating coupler period and tilt angle of the optical fiber, the grating may have an optimal efficiency for TE polarized light in the forward direction, and for TM polarized light in the backward direction. The coupling was simulated with Camfr (vectorial mode solver) and Omnisim (FDTD simulation software), resulting in TE coupling efficiency of 47% and TM coupling efficiency of 27%. In the embodiment of the device depicted in FIG. 8, the drop signal is monitored instead of the pass signal to avoid large reflections between the duplexers.

In FIG. 9, an access waveguide is dedicated for the read-out of each polarization. Separate grating couplers are used to couple the TE and TM polarization to the corresponding access waveguide.

As already mentioned above, in embodiments of the present invention, the interaction of the two different radiation modes is preferably as different as possible, for example with a large difference in confinement, in order to distinguish as accurately as possible between different molecule properties, such as e.g. molecule orientations. Due to this difference in confinement, the coupling factors in a directional coupler may also be very different for both modes. For example, the $TM_{00}$-mode in a 450 nm wide and 220 nm high waveguide is less confined than the $TE_{00}$-mode, so that the $TM_{00}$-mode will be much stronger coupled than the $TE_{00}$-mode in the same directional coupler.

Returning now to FIG. 13, the sensing device 100 furthermore comprises, for sensing purposes, a sensing surface 140. Such a sensing surface 140 may be modified to receive particular sample particles to be detected. The sensing surface 140 of the sensor may be modified by a coating which is designed to attract certain molecules or may e.g. be functionalised with bio-molecular recognition elements, such as e.g. capturing probes. Such molecules are know to the skilled person and include complementary DNA, antibodies, antisense RNA, etc. Such molecules may be attached to the surface by means of spacer or linker molecules. The surface of the sensor device can also be provided with molecules in the form of organisms (e.g. viruses or cells) or fractions of organisms (e.g. tissue fractions, cell fractions, membranes). The surface of biological binding can be in direct contact with the resonator element, but there can also be a gap between the sensing surface and the resonator element. For example, the binding surface can be a material that is separated from the resonator element, e.g. a porous material. Such a material can be a lateral-flow or a flow-through material, e.g. comprising microchannels in silicon, glass, plastic, etc. The bending surface can be parallel with the top surface of the resonator element. Alternatively, the binding surface can be under an angle with respect to, e.g. perpendicular to, the surface of the resonator element.

According to embodiments, the sensing device 100 also comprises a detector 150 or detection unit arranged for detecting the resonance wavelength shift for said two different radiation modes. The detector 150 or detection unit thereby comprises a processor 160 arranged for deriving from the detected resonance wavelength shifts for said two different radiation modes, a layer thickness and refractive index of the layer of receptor molecules. At least part of the detection unit may be integrated on the same photonics integrated circuit as the resonator element, although embodiments are not limited thereby.

The processor 160 which may physically be separated from the detecting element may be any suitable type of processor. It may be implemented in hardware as well as in software. The processor may include one or more of a CPU, a graphics processing unit, and a programmable digital signal processing unit. The processing system further may include a memory subsystem including main RAM and/or a static RAM, and/or ROM. A bus subsystem may be included for communicating between the components. If the processing system requires a display, such a display may be included. If manual data entry is required, the processing system also includes an input device such as one or more of an alphanumeric input unit such as a keyboard, a pointing control device such as a mouse, and so forth. The term memory unit as used herein also encompasses a storage system. The processor according to embodiments of the present invention is adapted for deriving from the detected resonance wavelength shifts for said two different radiation modes, a layer thickness and refractive index of the layer of receptor molecules. The latter may be performed in a plurality of way, such as for example as follows. The processor may be arranged for determining from the detected resonance wavelength shift for the first radiation mode a first set of possible values for layer thickness and refractive index, and for determining from the detected resonance wavelength shift for the second radiation mode a second set of possible values for layer thickness and refractive index. Based on these sets, the processor furthermore is programmed for deriving based on a comparison of said first set of possible values and said second set of possible values a set of derived values for the layer thickness and the refractive index of the layer of receptor molecules. Determining a set of possible values from the detected resonance wavelength shift for any of the first radiation mode or second radiation mode may comprise comparing the detected resonance wavelength shift with calibration data for the layer thickness and refractive index as function of the resonance wavelength shift. Such calibration data may be simulated data, reference data or data based on a physical model for the radiation mode under study. Deriving derived values based on a comparison of said first set of possible values and said second set of possible values may comprise finding a set of values for the layer thickness and refractive index being common to both the first set and the second set of possible values.

Figure 4:
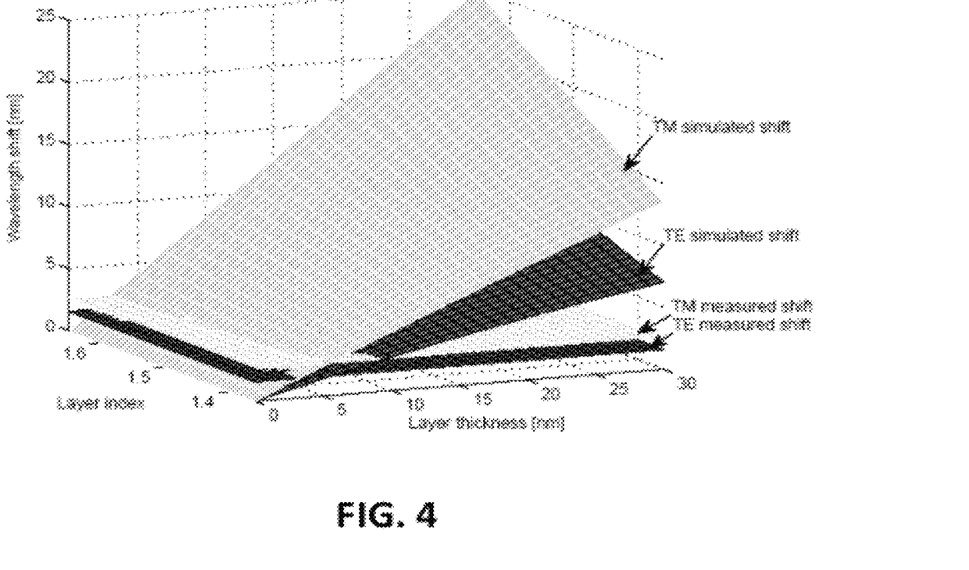
FIG. 4 illustrates measured and simulated wavelength shifts for the TE00 and TM00 mode, illustrating features and advantages of embodiments of the present invention.
Figure 5:
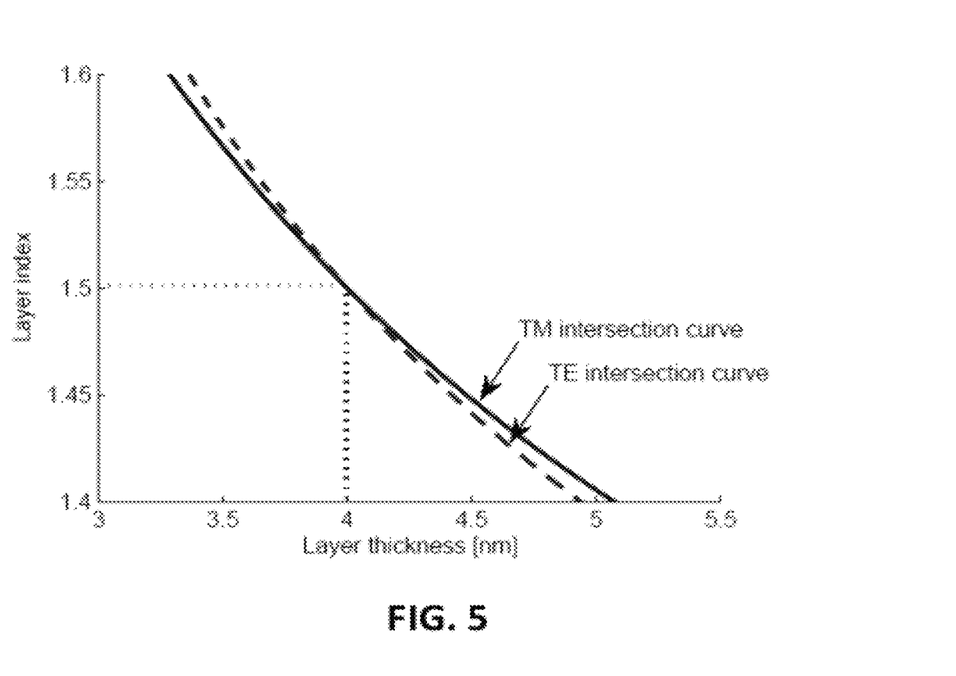
FIG. 5 illustrates TE and TM lines of intersection between measured and simulated wavelength shifts, whereby the intersection of both lines provides the layer thickness and layer index, according to an embodiment of the present invention.

In one particular example the processor may be programmed for, after measurement of $\Delta\lambda_{TE}$ and $\Delta\lambda_{TM}$, mapping the experimental results to the calibration data obtained with simulations or prior measurements. Such mapping may comprise simulating or measuring the possible wavelength shifts for the $(t_L, n_L)$ parameter space, as is for instance shown in FIG. 4. The results in the graph are simulated shifts obtained for a ring resonator with waveguide dimensions 220×450 nm. Measured values of $\Delta\lambda_{TE}$ and $\Delta\lambda_{TM}$ form two horizontal planes that intersect with the simulated surfaces. The intersection line of the measured and simulated TE-planes and the measured and simulated TM-planes can now be mapped onto a $(t_L, n_L)$ space, see FIG. 4. The intersection of both curves reveals the index and thickness of the layer unambiguously. In more detail, the processing may be performed as follows. The determination of thickness and refractive index can for example be performed in the following steps. First the resonance wavelength shift for both modes and for a range of thicknesses and refractive indices is simulated. This could also be replaced by calibration measurements or by the use of a physical model. Then, based on the shifts measured for both modes, the intersection lines between the simulated surface and the measured shift are determined, represented by a plane. This is done for both modes, as can be seen in FIG. 4. Both intersection lines can then be projected on the (t, n)-plane, as can be seen on FIG. 5 and thus the intersection point of both lines determines the derived thickness and refractive index of the deposited biolayer.

To determine the accuracy of this model, a 0.22 pm standard deviation is used on the measured shift due to several noise factors. This deviation of the location of the planes translates to an uncertainty of the location of the intersection lines and thus to an error on both thickness and refractive index.

To reduce this error two things are taken into account. Firstly, in order for the measurement error on the resonance wavelength shift to translate into a small uncertainty of the locations of both intersection lines, it is desired that both surfaces are as steep as possible. The more steep the surface is, the more sensitive this mode is. For example, by inspecting FIG. 4, it can be seen that the quasi TM-mode is more sensitive for this configuration than the quasi TE-mode. Secondly, both intersection curves in the (t, n) plane should have a divergence at the intersection point that is as different as possible. This will cause a shift of the location of the intersection lines to produce a smaller deviation from the actual (t, n) intersection point.

According to some embodiments of the present invention, temperature can be taken into account, e.g. by working at fixed temperature. According to some embodiments, the system furthermore may comprise a thermometer, i.e. a device for measuring the temperature, thus allowing a check that the sensing is performed at fixed temperature. Some examples of thermometers are a liquid thermometer, a thermocouple, etc. Another example of a thermometer that could be used is a reference resonator element, that is not influenced by the sample to be measured and that is calibrated with respect to temperature, such that a temperature can be derived from its optical behaviour. Alternatively or advantageously in addition thereto, the system furthermore may comprise a heater and/or cooler for actively controlling, setting and/or maintaining the working temperature in the system to a fixed temperature. One example of a known heater/cooler element is a Peltier element but other examples are known in the art.

The resolution and detection limit that is obtained using a measurement system as described above, depends not only on the sensitivity of the detector element for detecting the wavelength shift, but also on the resonances obtained. Preferably, the resonances in the transmission spectra for both radiation modes, e.g. radiation modes of different polarization, are very deep in order to be able to sense with a high resolution and good detection limit. This means that the extinction for both modes has to be large. Such a configuration results in the ability to distinguish small shifts of these resonances. Typically the extinction may be in the order of 15 dB for both modes. The directional couplers therefore are preferably designed so that a large extinction is obtained for both modes. Use is for instance made of the periodicity in the coupled power as a function of coupling distance in the directional coupler.

Figure 10:
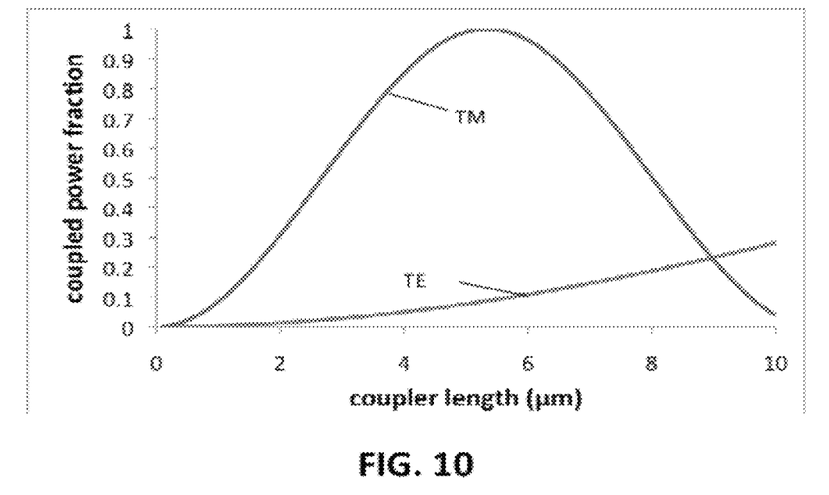
FIG. 10 illustrates a coupled power fraction for TE and TM modes in a directional coupler with 450 nm wide waveguides and with a 200 nm gap, as can be used in an embodiment according to the present invention.

FIG. 10 shows the coupled power fraction for both modes in a directional coupler with 450 nm wide and 220 nm high waveguides and with 200 nm gap between the waveguides. Such an embodiment may result in a very large mismatch between the coupling of e.g. a TE-mode and that of a TM-mode. Coupling a specified power fraction to each of the different modes can be achieved by designing for instance a long directional coupler in which the power of the strongly coupled mode is coupled back and forth the 2 waveguides one or more times, to allow to also couple enough power for the weakly coupled mode.

Figure 11:
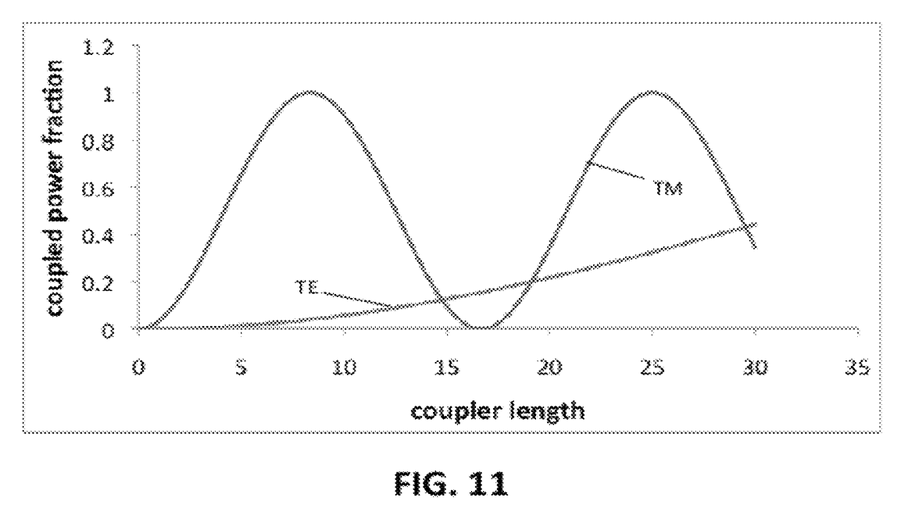
FIG. 11 illustrates a coupled power fraction for TE and TM modes in a directional coupler with 450 nm wide waveguides and with a 300 nm gap, as can be used in an embodiment according to the present invention.

This can be seen in the simulation of a directional coupler with 450 nm wide waveguides and 300 nm gap, presented in FIG. 11.

If in this example the coupled power fraction for TE is specified at 0.11 and that of TM at 0.23, a coupler length of 14 µm may be a good choice.

The device 100 as described above also may comprise a radiation source for providing radiation for which two different radiation modes are to be coupled to the resonator element. Furthermore the device 100 also may comprise radiation delivery components for bringing the radiation towards the resonator element. Such radiation delivery components can for example be waveguides. Also for outcoupling radiation towards the detector radiation delivery components such as waveguides can be used.

As indicated above, embodiments of the present invention do not only relate to devices but also to methods for sensing a substance. According to embodiments of the present invention, a method for sensing a substance is disclosed, the method comprising coupling two different radiation modes, e.g. radiation modes of different polarisation, into a resonator element and supporting the different radiation modes in the resonator element, allowing formation of a layer of receptor molecules on a sensing surface of the device, detecting a shift in the resonance wavelength for both different radiation modes and deriving, from the detected resonance wavelength shifts for said two different radiation modes, a layer thickness and refractive index of the layer of receptor molecules. Coupling and/or supporting may be performed subsequently or simultaneously. Deriving a layer thickness and refractive index may comprise determining from the detected resonance wavelength shift for the first radiation mode a first set of possible values for layer thickness and refractive index, determining from the detected resonance wavelength shift for the second radiation mode a second set of possible values for layer thickness and refractive index, and deriving based on a comparison of said first set of possible values and said second set of possible values a set of derived values for the layer thickness and the refractive index of the layer of receptor molecules. Determining a set of possible values from the detected resonance wavelength shift for any of the first radiation mode or the second radiation mode may comprise comparing the detected resonance wavelength shift with calibration data for the layer thickness and refractive index as function of the resonance wavelength shift. The calibration data may be simulated data, reference data or data based on a physical model for the radiation mode under consideration. Deriving derived values based on a comparison of said first set of possible values and said second set of possible values may comprise finding a set of values for the layer thickness and refractive index being common to both the first set and the second set of possible values. The method also may comprise taking into account a measured temperature using a thermometer. The method also may comprise setting the sensing device used for sensing to a predetermined temperature. The method may especially be useful for sensing using a sensing device as described above. Further method steps or part thereof may also be included, e.g. steps expressing the functionality of features of the sensing device as described above.

In another aspect, the present invention also relates to a processor for performing the steps of processing measured resonance wavelength shifts as described above. The processor thus may be programmed for deriving a layer thickness and refractive index of a layer of receptor molecules, whereby the deriving being based on detected resonance wavelength shifts for two different radiation modes, e.g. radiation modes of different polarisation, supported by a resonator element, and whereby the wavelength shifts being induced upon formation of a layer of receptor molecules onto a sensing surface near the resonator element. Further features and advantages may be as described above.

By way of illustration, embodiments of the present invention not being limited thereto, the detection limit and/or the $(t_L, n_L)$ accuracy of devices and methods according to embodiments of the present invention are discussed in more detail below and a method for optimisation is described, illustrating features and advantages of some embodiments according to the present invention. Use is made, only by way of illustration, of a TE and a TM mode, embodiments of the present invention not being limited thereto.

Figure 6:
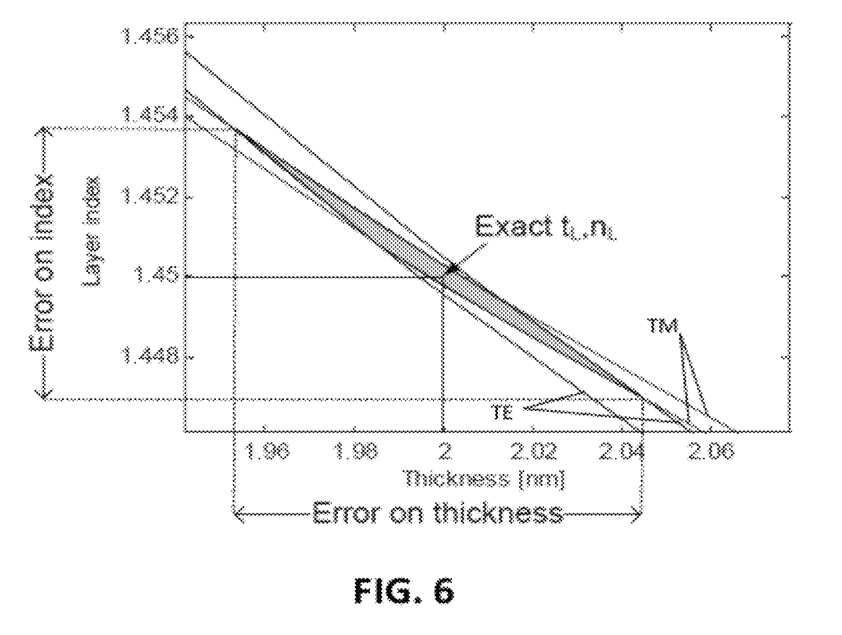
FIG. 6 illustrates the effect of a limited measurement resolution $\Delta\lambda_{min}$ on the accuracy on thickness $t_L$ and index $n_L$ determination, illustrating features and advantages of embodiments of the present invention.
Figure 7:
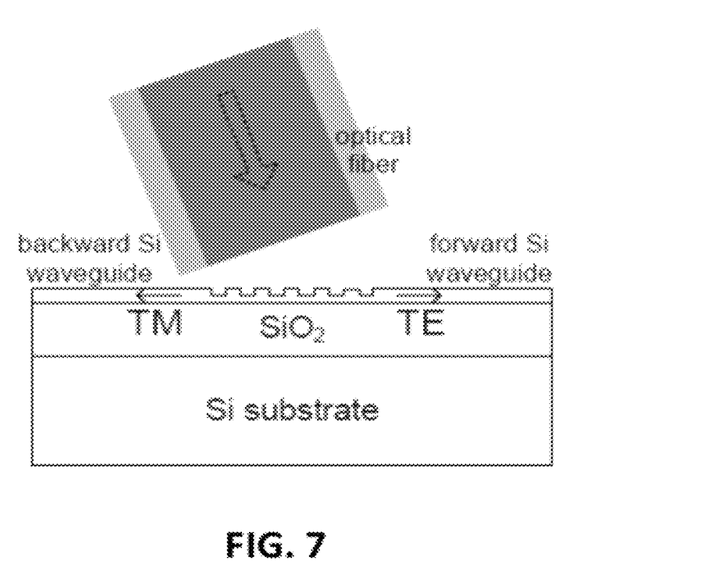
FIG. 7 illustrates a dual polarization grating coupler whereby $TE_{00}$ and $TM_{00}$ modes are coupled in opposite directions, as can be used in an embodiment of the present invention.

The detection limit of a sensing device as used in the present invention is defined as DL=$\Delta\lambda_{min}$/sensitivity wherein $\Delta\lambda_{min}$ is the minimal detectable wavelength shift and the sensitivity is defined as the amount of change in sensor output response, e.g. the wavelength shift, resulting from a molecular change on the sensor surface. A low detection limit requires a low $\Delta\lambda_{min}$ and large wavelength shifts $\Delta\lambda_{TE}$ and $\Delta\lambda_{TM}$. A wavelength shift can only be resolved within the measurement resolution This translates into an uncertainty on the location of the horizontal 'measured' TE and TM-planes (horizontal planes on FIG. 4). This uncertainty is transferred in a spread on the intersection lines and hence in an area of possible $(t_L, n_L)$ values. This is shown in FIG. 6. Depending on the slope of the simulated TE- and TM-planes and on the angle between the intersection lines, this area is increased or reduced. Apart from a low detection limit, the $(t_L, n_L)$ uncertainty area is an additional measure for the quality of the sensor and is preferably minimized. Both figures depend on measurement resolution $\Delta\lambda_{min}$ and sensitivity.

The measurement resolution $\Delta\lambda_{min}$ depends for instance on resonance shape and instrumentation factors as is for instance described in J. Hu, X. Sun, A. Agarwal and L. C. Kimerling, Design guidelines for optical resonator biochemical sensors, J. Opt. Am. B., vol. 26, No. 5, May 2009. The resonance shape of the TE and TM resonances will depend on losses and coupling of the two resonating modes. Typical value for $\Delta\lambda_{min}$ is 1 pm for the $TE_{00}$ and $TM_{00}$ modes.

The device and method according to embodiments of the present invention allows simultaneous guiding of two different modes, for instance the $TE_{00}$ and $TM_{00}$ mode. Alternatively, the modes may be guided subsequently. The design parameters of the waveguide are limited to width W and height H of the waveguide. Only for a limited range of W and H values, the method and device allows for single mode guiding of the $TE_{00}$ and the $TM_{00}$ mode, while $TE_{01}$, $TM_{01}$ and higher order modes will be in cut-off. Modes with effective indices above $n_{SiO2}$ will not be radiated into the buffer layer and will be guided.

Simulation of the effective index of the modes across the (W, H) parameter space may provide us with the correct (W, H) values.

The detection limit is determined by the measurement resolution $\Delta\lambda_{min}$ and the sensitivity. If $\Delta\lambda_{min}$ is set to 1 pm, the sensitivity however, will largely depend on the waveguide dimensions because of the strong dimensional influence on the mode distribution. Designing a high quality dual beam biosensor imposes that we search for W and H that provide optimal sensitivity for the $TE_{00}$ mode as well as for the $TM_{00}$ mode. For all single mode (W, H) values we simulated the TE and TM wavelength shift induced by a layer of thickness $t_L$=4 nm and refractive index $n_L$=1.45 and calculated the sensitivity [nm/nm/RIU] for both modes as:

$$\text{Sensitivity=shift/(thickness·layer index)=} \Delta\lambda_{res}(n_{\textit{eff,layer}} - n_{\textit{eff,0}}) n_g / t_L (n_L - n_{water})$$

When considering small layers the shift is linear with refractive index and layer thickness. With a larger fraction of the field in the layer, the effective index is more sensitive to layer variations. For TM polarized light, the effective index is more sensitive to changes on the top waveguide surface. Hence waveguides with a relatively large top surface area as compared to the sidewall surface area (H<W) are more sensitive. E.g. a maximal TM sensitivity of 2.252 nm/nm/RIU was found for W=420 nm and H=210 nm.

The reverse reasoning holds for TE polarized light; when W<H the influence of the field discontinuity at the side walls dominates and waveguides with a large side wall surface area are more sensitive. E.g. a maximal TE sensitivity of 4.126 nm/nm/RIU was found for W=220 nm and H=430 nm4.

This reveals that, although the TM sensitivity is larger for our photonic wires (with fixed height of 220 nm), the maximal sensitivity of the $TE_{00}$ mode can be about twice as large as the maximal obtainable sensitivity of the $TM_{00}$ mode when having full flexibility on the waveguide dimensions.

For a wire with dimensions W=240 nm and H=280 nm, the product of TE and TM sensitivity was found to be optimal. TE and TM sensitivity are respectively 3.295 and 2.117 nm/nm/RIU. As expected this optimum occurs for a nearly square wire configuration. With this sensor configuration the minimum detectable mass equals 91 and 142 ag for the TE and TM mode respectively and minimum detectable surface coverage equals 2.9 and 4.5 pg/mm2 respectively. These numbers are calculated with Δλmin=1 pm, layer index=1.45, ρprotein=1.33 g/cm3 and surface area=31.5 μm2.

$t_L$ and $n_L$ accuracy are determined by investigating the spread of the intersection lines for a change in wavelength of 1 pm, and translating this to a spread on the intersection points $(t_L, n_L)$, as shown in FIG. 6. For a certain waveguide configuration, the accuracy of both $t_L$ and $n_L$ also depends on the actual $t_L$ and $n_L$ values. The slopes of the TE and TM wavelength shift surfaces differs at all positions, and the angle formed by the intersection lines varies as well.

Further by way of example, the effect of embedding the resonator element such that there is a planarized surface is obtained, according to an embodiment of the present invention, is studied. This is performed by comparing two structures, one having a resonator element on top of a device, a second one having a resonator element being embedded in the device structure thus having a planarized surface. In the planarized structure, the sidewalls of the waveguide are covered with silicon dioxide and only the top is accessible for the sample.

Figure 12A:
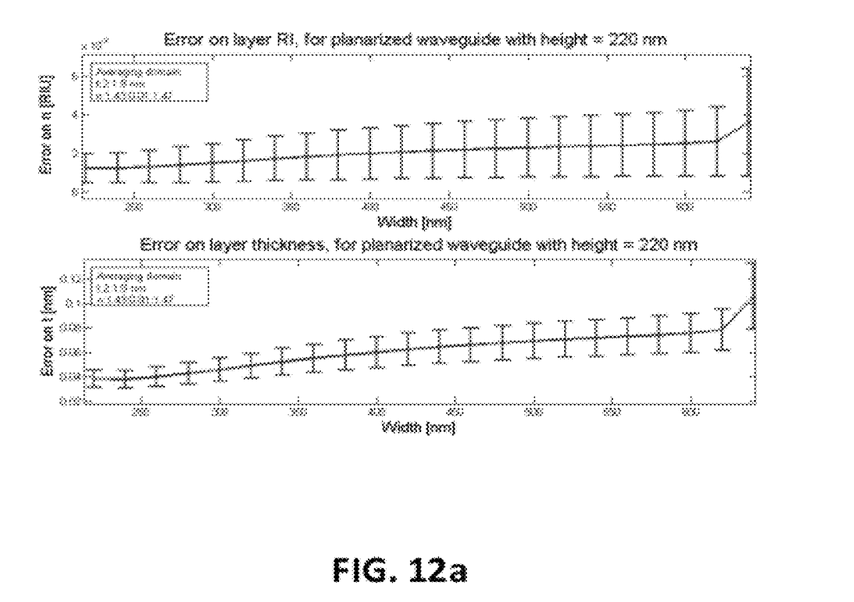
FIG. 12a illustrates the error on the refractive index (upper graph) and the layer thickness (lower graph) for a planarized resonator element, according to an embodiment of the present invention.
Figure 12B:
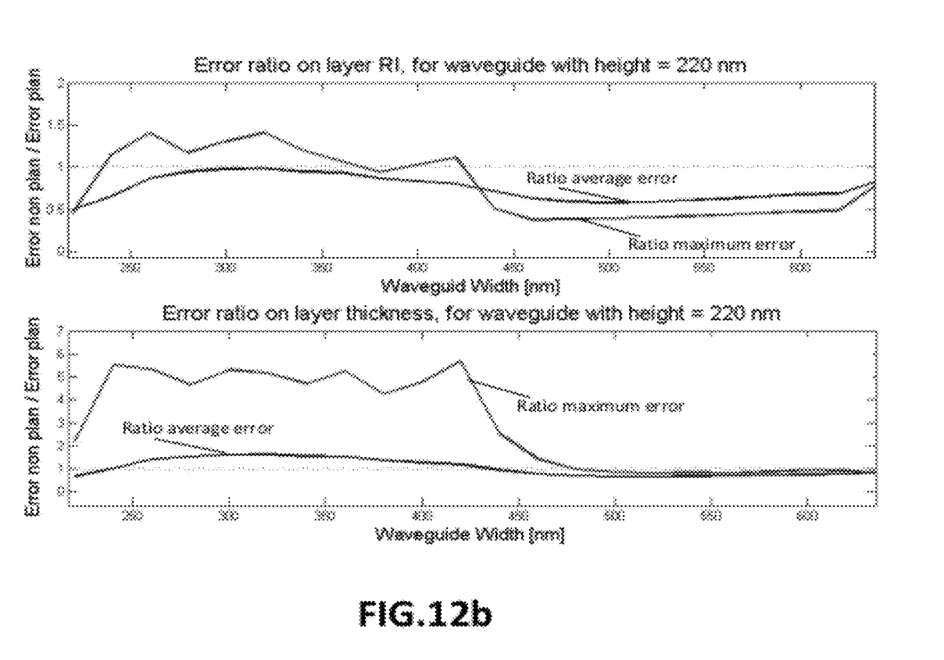
FIG. 12b illustrates the ratio of the error on the refractive index (upper graph) for a non planarized resonator element with respect to a planarized resonator element and the ratio of the error on the layer thickness (lower graph) for a non planarized resonator element with respect to a planarized resonator element, thus illustrating features and advantages of embodiments of the present invention.

In the comparison, a quantification of the error on the determined thickness and the refractive index of the layer is performed, using a method as described above. The software package Fimmwave in combination with Matlab is used to obtain the wavelength shift surfaces for both modes (TE, TM) in a microring structure having a fixed height and a varying width. The height was determined by the lithographic processing silicon and was fixed at 220 nm, while widths from 220 nm to 640 nm are used. In FIG. 12a the average error on the determination of thickness and refractive index of a biolayer with a thickness between 2 nm and 9 nm and a refractive index between 1.43 and 1.47, is illustrated for a planarized waveguide, i.e. a microring that is embedded and only has its top surface free. In FIG. 12b a comparison is made with a non-planarized waveguide by means of the ratio of the error for the non-planarized design on the error for a planarized design. This is done for the maximal error and the average error in the (t,n) region of interest. It can clearly be seen the planarized waveguide outperforms the non-planarized in terms of maximal error on thickness that is reduced by a factor 5 for waveguides with a width up to 450 nm. For other waveguides, both design perform more or less equally. However, a planarized design is easier to functionalise as opposed to a non-planarized one.

The invention claimed is:

1. A sensing device for sensing a substance, the sensing device comprising:
a photonics integrated circuit comprising a resonator element arranged to support two different radiation modes at a predetermined resonance wavelength;
the resonator element being configured to convert a phase change or amplitude change experienced by said two different radiation modes upon formation of a layer of receptor molecules onto a sensing surface of the device into a resonance wavelength shift for said two different radiation modes; and
a detection unit arranged to detect the resonance wavelength shift for said two different radiation modes, wherein the detection unit comprises a processor arranged to derive from the detected resonance wavelength shifts for said two different radiation modes, a layer thickness and refractive index of the layer of receptor molecules.

2. The sensing device according to claim 1, wherein the resonator element arranged to support two different radiation modes is arranged to support two radiation modes of different polarisation comprising a TE mode and a TM mode.

3. The sensing device according to claim 1, the two different radiation modes being a first radiation mode and a second radiation mode, wherein the processor arranged to derive a layer thickness and refractive index of the layer of receptor molecules is arranged to:
determine from the detected resonance wavelength shift for the first radiation mode a first set of possible values for layer thickness and refractive index;
determine from the detected resonance wavelength shift for the second radiation mode a second set of possible values for layer thickness and refractive index; and
derive, based on a comparison of said first set of possible values and said second set of possible values, a set of derived values for the layer thickness and the refractive index of the layer of receptor molecules.

4. The sensing device according to claim 3, wherein the processor is configured to determine the set of possible values from the detected resonance wavelength shift for any of the first or second radiation mode by comparing the detected resonance wavelength shift with calibration data for the layer thickness and refractive index as function of the resonance wavelength shift.

5. The sensing device according to claim 4, wherein the calibration data comprise simulated data, reference data or data based on a physical model for the corresponding radiation mode.

6. The sensing device according to claim 3, wherein said processor is configured to derive the derived values based on a comparison of said first set of possible values and said second set of possible values based on finding a set of values for the layer thickness and refractive index that is common to both the first set and the second set of possible values.

7. The sensing device according to claim 1, wherein the sensing device further comprising a thermometer that measures a temperature at which the sensing is performed.

8. The sensing device according to claim 1, the sensing device comprising a heater and/or cooler that sets the temperature at which the sensing is performed to a predetermined temperature.

9. The sensing device according to claim 1, wherein the resonator element is embedded in the device so that a top surface of the resonator element is planar with a remaining part of the device.

10. The sensing device according to claim 1, wherein the resonator element protrudes from the device.

11. The sensing device according to claim 1, wherein the resonator element is arranged to support simultaneously the two different radiation modes.

12. A processor configured to derive a layer thickness and refractive index of a layer of receptor molecules, said deriving being based on detected resonance wavelength shifts for two different radiation modes supported by a resonator element, said wavelength shifts being induced upon formation of a layer of receptor molecules onto a sensing surface near the resonator element.

13. A method for sensing a substance, the method comprising:
coupling different radiation modes into a resonator element and supporting the different radiation modes in the resonator element;
allowing formation of a layer of receptor molecules on a sensing surface of the device;

detecting a shift in the resonance wavelength for the different radiation modes; and deriving, from the detected resonance wavelength shifts for said different radiation modes, a layer thickness and refractive index of the layer of receptor molecules.

14. The method according to claim 13, the method comprising coupling and/or supporting the radiation modes simultaneously or subsequently to or in the resonator element.

15. The method according to claim 13, the different radiation modes comprising a first radiation mode and a second radiation mode, the method comprising deriving a layer thickness and refractive index by:

determining from the detected resonance wavelength shift for the first radiation mode a first set of possible values for layer thickness and refractive index;

determining from the detected resonance wavelength shift for the second radiation mode a second set of possible values for layer thickness and refractive index; and deriving based on a comparison of said first set of possible values and said second set of possible values a set of derived values for the layer thickness and the refractive index of the layer of receptor molecules.

16. The method according to claim 15, wherein determining a set of possible values from the detected resonance wavelength shift for any of the first or second radiation mode comprises comparing the detected resonance wavelength shift with calibration data for the layer thickness and refractive index as function of the resonance wavelength shift.

17. The method according to claim 16, wherein the calibration data are any of simulated data, reference data or data based on a physical model.

18. The method according to claim 13, the method comprising measuring a temperature using a thermometer and taking into account said measured temperature.

19. The method according to claim 13, the method comprising setting the resonator element to a predetermined temperature.

* * * * *